Nov. 4, 1969 E. N. SIEDER 3,476,654
MULTISTAGE FLASH DISTILLATION WITH SCALE REMOVAL
Filed Sept. 29, 1967
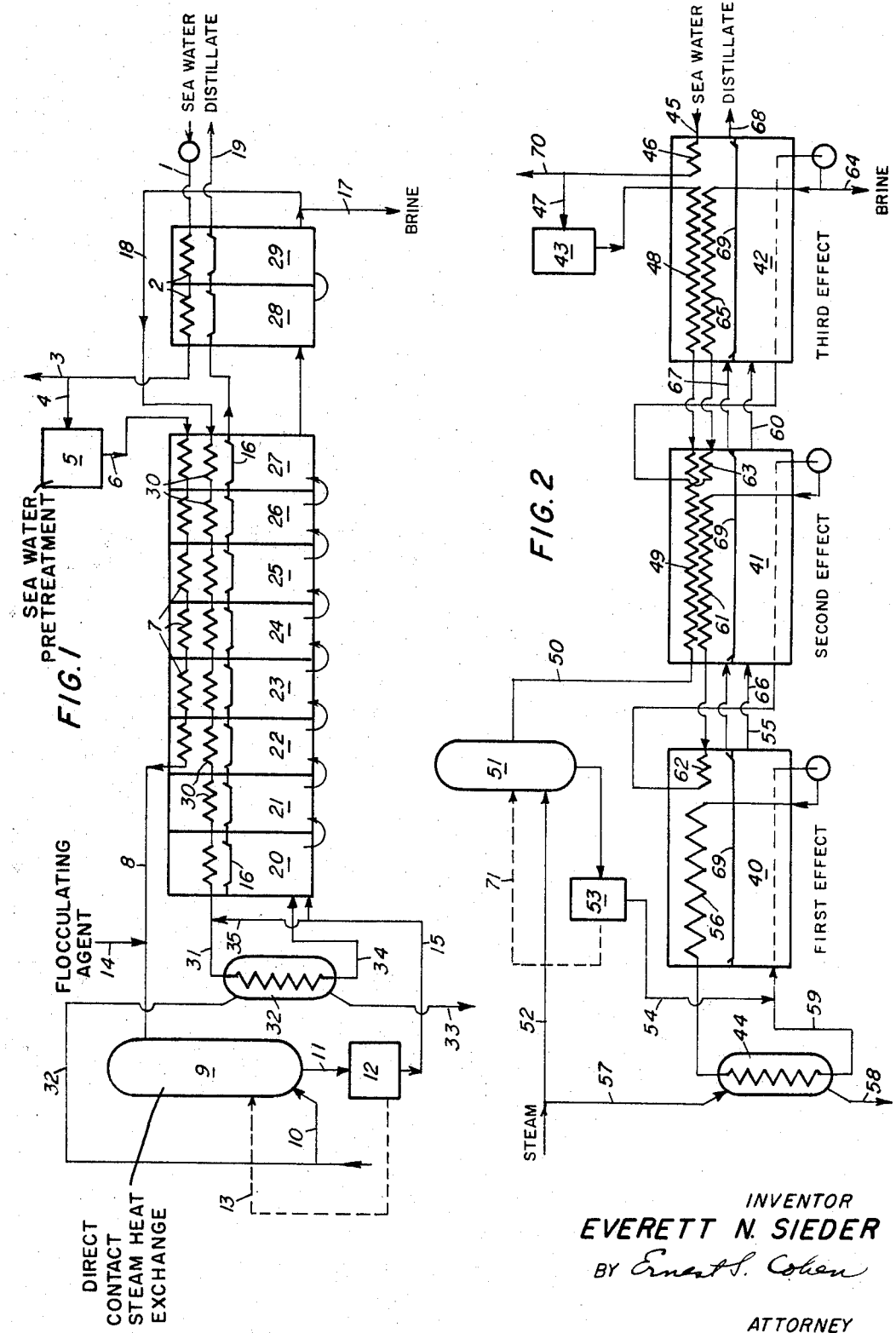
INVENTOR
EVERETT N. SIEDER
BY Ernest S. Cohen
ATTORNEY United States Patent Office 3,476,654
Patented Nov. 4, 1969

3,476,654
MULTISTAGE FLASH DISTILLATION
WITH SCALE REMOVAL
Everett N. Sieder, McLean, Va., assignor to the United
States of America as represented by the Secretary of the
Interior
Filed Sept. 29, 1967, Ser. No. 671,895
Int. Cl. B01d 3/06; C02b 1/06
U.S. Cl. 203—7                                    9 Claims

ABSTRACT OF THE DISCLOSURE

In a multistage flash, evaporation process for distilling saline water, scale formation is prevented by heating the saline water feed by indirect heat exchange with flashing vapors to a temperature slightly less than that which produces scaling, then further heating the feedwater by direct contact with steam to precipitate scale formers and thereafter separating the precipitated scale from the saline water feed.

Background of the invention

One of the most difficult problems in the distillation of saline water to produce potable water remains the formation of scale on heat exchanger surfaces. Scale can precipitate whenever the solution becomes supersaturated with respect to the solid phase. Dissolved salts such as calcium sulfate which display an inverted solubility curve present the greatest problems since precipitation of the dissolved salt as scale is caused both by concentration of the solution by evaporation and by heating.

Scale formed in sea water distillation consists primarily of calcium carbonate, magnesium hydroxide and various calcium sulfates. It is known that pH control by sulfuric acid addition, followed by decarbonation, can effectively prevent all carbonate and magnesium hydroxide scale. Acid addition must exceed the stoichiometric amount required to neutralize all alkalinity. Decarbonation must be practically complete in order to avoid excessive corrosion and formation of carbonate scale.

When the sea water feed to a distillation plant is treated in the above manner, it has been found that a recycle plant can operate with heat exchanger surface temperatures as high as 250° F. at a concentration factor of 2.0, or 270° F. at a concentration factor of 1.5 without the formation of calcium sulfate scale. Since the formation of calcium sulfate scale is a time dependent phenomenon, it is possible to operate the process at even higher temperatures on a once-through basis. For example, treated sea water (concentration factor 1.0) may be heated to as high as 290 to 300° F. on a once-through basis without scaling.

The overall heat efficiency of a multistage distillation system is a function primarily of the temperature range through which the system is operated. Operation of the lowest temperature stage below about 110 to 115° F. becomes impractical due to the negligible vapor pressure of water at those temperatures. Further significant gains in efficiency must come by increasing the operating temperature of the first, or highest temperature, distillation stages.

Increasing the operating temperature of the first or highest temperature stages above about 250 to 270° F. causes the precipitation of calcium sulfate and results in severe scaling of heat exchanger surfaces with a concomitant loss in heat transfer efficiency. Thus, in order to significantly increase the operating temperature range of a multistage distillation process, it is necessary to control calcium sulfate scaling.

There are a variety of known methods for controlling calcium sulfate scaling. Generally, these known methods can be grouped in two classes; removal of the calcium ions, the sulfate ions or both from the sea water feed and controlling and localizing the precipitation of calcium sulfate in one particular area of the distillation apparatus. The first method is illustrated by the precipitation of calcium as calcium phosphate by treating the sea water feed with phosphoric acid. While this process results in a relatively scale-free feedwater, it also results in the production of large quantities of by-product which is difficult to dispose of economically.

Typical of the second method is the Badger process described in U.S. Patent 2,979,442 of Apr. 11, 1961. Scale is controlled in this process by maintaining a slurry of scale particles in the evaporating distilland so as to provide seed crystals or precipitation nuclei upon which additional scale formers preferentially precipitate. Scale formation on heat exchanger surfaces is effectively controlled in this manner but the problems and disadvantages of handling a slurry are readily apparent.

In this invention, a saline water feed is first indirectly heated to a temperature slightly below that at which calcium sulfate and other scale formers begin to precipitate and is thereafter further heated by direct contact with steam to the maximum temperature utilized in the process. Such direc heating avoids all heat exchanger scaling problems and results in the formation of a suspension of scale particles in the feedwater stream. The scale particles are then removed from the feedwater stream which is then passed as distilland to the evaporation stages of a multistage flash evaporator.

It is an object of this invention to precipitate and remove scale forming materials from saline water.

Another object of this invention is to allow a multistage saline water evaporation process to be operated at higher temperatures.

A further object of this invention is to remove calcium sulfate from sea water so as to provide a relatively scale-free feed stream for a multistage distillation process producing potable water and a concentrated brine.

Description of the invention

The invention will be more clearly understood from the following description of a preferred embodiment wherein reference is made to the accompanying drawings.

FIGURE 1 is a schematic flow diagram of a multistage flash distillation system incorporating the descaling process of the invention.

FIGURE 2 is a schematic flow diagram illustrating the use of the invention in a multi-effect-multistage flash distillation process.

Referring to FIGURE 1, sea water enters the system through conduit 1 and then passes through the condensers 2 in the heat reject stages 28 and 29. As the sea water passes through the condensers, it is partially heated by condensing vapors from flashing brine. After leaving the condensers 2, a portion of the sea water is discharged from the system at 3 for heat balance purposes and the remainder 4, which is the feed stream for the system, is passed to treatment unit 5.

In unit 5, the sea water feed is suitably treated by the addition of chemicals and by deaeration as is conventionally done. It is preferred that the sea water treatment comprise a pH control by sulfuric acid addition followed by substantially complete decarbonation so as to eliminate any problems of carbonate and magnesium hydroxide scaling.

The treated sea water leaves unit 5 via line 6 and passes to heat recovery condensers 7 of the staged flash evaporators 27 through 22 and is progressively heated while serving as a condensing medium for the flash evaporators. Heating is allowed to progress to a temperature slightly below that temperature at which calcium sulfate will precipitate and form scale. Depending upon the number of stages in the system and upon the approach temperature in the condensers, this temperature may be achieved several stages from the highest temperature stage 20. For illustration purposes, the feedwater is shown to be withdrawn from the third highest temperature stage 22. At this point, the temperature of the sea water can be as high as 270 to 290° F. depending upon the type of feedwater treatment performed in unit 5.

From stage 22, the sea water feed is piped via line 8 to direct contact heat exchanger 9. In this heat exchanger, steam is injected through line 10 directly into the feedwater thereby increasing the temperature sufficiently to cause calcium sulfate to precipitate. For most efficient operation, it is desirable that the feedwater be heated in exchanger 9 to a temperature range which favors the precipitation of calcium sulfate anhydrite. Since this is the least soluble form of calcium sulfate, such operation provides the maximum removal efficiency. The feedwater stream containing a suspension of precipitated calcium sulfate particles is then passed from heat exchanger 9 via line 11 to separation zone 12. Here, the calcium sulfate slurry is subjected to a separation treatment to produce a water fraction substantially free of solids. Separation may comprise any conventional method such as filtration, centrifugation and the like. However, it is preferred to perform the clarification by means of filtration.

Depending upon the operating conditions of the process, it may be advantageous to supply seed crystals or precipitation nuclei to the direct contact heat exchanger. This may conveniently be done by recycling a portion of the calcium sulfate removed in zone 12 back to exchanger 9 via conduit 13. Alternatively, a flocculating agent such as aluminum chloride may be added at any convenient location. For example, aluminum chloride may be added to the feedwater through pipe 14 just prior to its entry into heat exchanger 9. Aluminum chloride concentrations in the range of 5 to 200 p.p.m. have been found effective.

Clarified water is removed from separation zone 12 and is then conveyed to the flash evaporator system via conduit 15 where it mixes with recycle brine. The combined stream is then passed through staged flash evaporators 20 through 27 which are serially connected in a well known manner. The procedure is essentially one of flash evaporation and condensation in which the hot stream flows from stage 20 whereat the temperature and pressure of the system is highest, to stage 29 at which the system temperature and pressure is lowest. Condensate formed constitutes the product water and is carried away in conduits connected to condensate collector devices 16 which are suitably positioned below the condensing structures in each stage. Condensate is discharged from the system via line 19.

From final evaporator stage 29, relatively cool, concentrated brine is removed and is divided into two portions. One portion is discharged to waste through line 17 and the remainder is recycled by way of conduit 18 to a second set of condensers 30 in the heat recovery stages. The recycle brine, as it passes serially through condensers 30, acts as a condensing medium for the flashing brine in each stage. Thus, it is progressively heated as each succeeding stage is maintained at a higher temperature and pressure.

From the highest temperature stage 20, the recycle brine is passed by way of conduit 31 to indirect heat exchanger 32 where its temperature is raised to match the temperature of the feedwater discharging from the filter via pipe 15. Steam enters the brine heater by way of conduit 32 and is discharged as condensate via line 33. The brine discharges from the brine heater 32 and is conveyed by means of conduit 34 to the highest temperature evaporator stage 20 where it mixes with the feedwater from line 15. Alternatively, the clarified feedwater stream may be mixed with recycle brine from stage 20 by diverting stream 15, via line 35, to line 31 so as to mix the two streams prior to entry into the brine heater 32. Such mixing of the two streams dilutes the recycle brine and further reduces the possibility of scaling in the brine heater 32.

Referring now to FIGURE 2, this diagram illustrates the adaptation of this invention for use in a multi-effect, multistage unit. A saline water flash evaporator system is represented as having a first, second and third multistage effect, 40, 41 and 42, respectively. These effects are shown interconnected with each other and as having a feedwater treatment unit 43, and a recycle brine heater 44 joined thereto. The stages making up each effect are serially connected in a well known manner to facilitate the flow of feed brine through individual water heat exchangers provided in the upper portions of each stage, to move countercurrent to the flow of heated effluent brine leaving the brine heater and moving successively through the individual flash chambers of the stages. Essentially, the procedure involved is one of flash evaporation and condensation wherein the heated brine flows from the first stage of effect 40, at which the temperature and pressure of the system are highest, to the last stage of effect 42 wherein the system temperature and pressure are lowest. Condensate formed, which constitutes the product water, is carried away in conduits connected to collector devices 69 positioned under the condensing structures in the stages.

According to the present invention, a brine feed enters the system at 45 passes through heat reject stages 46 and a portion is then passed via line 47 to feedwater treatment 43 while the remainder is discharged from the system at 70. After conditioning and treatment, the feedwater stream leaves unit 43 and passes to condensers 48 of the staged flash evaporators making up the third effect 42. The feedwater stream is progressively heated while serving as a condensing medium for the flash evaporators. After passing through the third effect, the feedwater similarly is progressively heated while traversing condensers 49 of the staged flash evaporators making up the second effect 41. Upon leaving the second effect wherein the feedwater has been heated to a temperature somewhat below that at which calcium sulfate begins to precipitate out of solution, the feedwater stream is conveyed via conduit 50 to direct contact heat exchanger 51. In this heat exchanger, steam is injected through line 52 directly into the feedwater thereby increasing the temperature sufficiently to cause the spontaneous precipitation of calcium sulfate. Precipitated calcium sulfate is removed from the feedwater stream, preferably by filtration, in separation zone 53. A portion of the removed calcium sulfate particles may be recycled back to heat exchanger 51 via line 71 to serve as precipitation nuclei.

Clarified water is removed from the separation zone via conduit 54, is mixed with heated recycle brine, and the combined stream is then introduced into the highest temperature stage of the first effect 40. The mixed brine stream then traverses the multiple stages making up the first effect and is progressively cooled and concentrated by evaporation of a portion of the brine. At the lowest temperature stage of the first effect, the brine stream is divided into two portions; one of which is passed to the highest temperature stage of the second effect via conduit 55 and the other of which is passed as a condensing medium through condensers 56 of the higher temperature stages of the first effect. From the condensers 56, the recycle brine stream is further heated in indirect heat exchanger 44. Heat is supplied to exchanger 44 by means of steam entering via line 57. Condensate is removed from the heat exchanger through line 58. The heated recycle brine, now at the temperature of the clarified feed stream from direct heat exchanger 51, is passed via line 59 to the highest temperature stage of the first effect 40.

In the second effect, brine from the lowest temperature stage is similarly split into two portions; one being passed via conduit 60 to the highest temperature stage of the third effect and the other being circulated as a condensing medium through condensers 61 and thence into condensers 62 of the first effect. Condensers 62 act as a heat reject for the first effect and as a brine heater for the second effect. Condensers 63 perform an identical function for the second and third effects. Brine from the lowest temperature stage of the third effect is similarly split into two portions; one of which is removed from the system via line 64 while the other portion is circulated as a heat recovery and condensing medium through condensers 65, thence to condensers 63 of the second effect, and is thereafter introduced into the evaporation section of the highest temperature stage of the third effect. Product water passes from the first effect serially through the second and third via conduits 66 and 67 and is removed from the system by way of conduit 68.

While a preferred operating procedure for the invention has been illustrated and described herein, it is to be understood that the invention is not limited thereby, but is susceptible to change in form and detail.

What is claimed is:

1. A process for the distillation of saline water containing scale forming materials including calcium sulfate to produce potable water and a concentrated brine which comprises passing a saline water feed stream serially through stages of a multistage flash evaporator in indirect heat exchange relationship with vapor produced by flashing brine in said evaporator stages, said saline water feed progressing in countercurrent relationship to said flashing brine and being heated to progressively higher temperatures by acting as a condensing medium for said flashing vapor, removing said saline water feed from heat exchange relationship with said flashing brine vapors when the feedwater temperature is raised to a point slightly below that at which said scale forming materials begin to precipitate, said feedwater temperature being substantially below that of the highest temperature stage of the serially arranged evaporator stages, further heating said removed feedwater by direct contact heat exchange with steam in a heat exchanger thereby increasing the temperature of the feedwater to cause precipitation of calcium sulfate and other scale forming materials as a suspension in said feedwater, passing the suspension from the heat exchanger to a separation zone and removing said precipitated scale forming materials from the thus treated feedwater and passing the resultant descaled feedwater as distilland to said highest temperature stage of said flash evaporator stages.

2. The process of claim 1 wherein said saline feedwater is treated by acid addition and is substantially completely decarbonated prior to being passed through the heat recovery stages of said multiple stage flash evaporator.

3. The process of claim 1 wherein a portion of said precipitated scale forming materials which have been removed from said feedwater is recycled and mingled with said feedwater during said direct heat exchange step so as to provide condensation nuclei for said precipitation.

4. The process of claim 3 wherein said scale forming materials comprise calcium sulfate.

5. The process of claim 1 wherein a portion of said concentrated brine is passed serially through the stages of said flash evaporator separately from said saline water feed stream and in indirect heat exchange relationship with vapor produced by flashing brine in said evaporator stages, said concentrated brine passing in countercurrent relationship to said flashing brine and being heated to progressively higher temperatures by acting as a condensing medium for said flashing vapors, removing said concentrated brine from the highest temperature and pressure stage of said flash evaporator, heating said removed concentrated brine by indirect contact with an external heat source, and thereafter mingling said concentrated brine with said feedwater to form a combined stream and passing said combined stream as distilland through said flash evaporator stages.

6. The process of claim 1 wherein a flocculating agent is added to said removed feedwater prior to the step of further heating said removed feedwater by direct heat exchange with steam.

7. The process of claim 6 wherein said flocculating agent comprises an aluminum salt.

8. The process of claim 1 wherein the stages of said multistage flash evaporator are divided into a plurality of serially connected effects.

9. The process of claim 1 wherein said saline water comprises sea water, said scale forming materials comprise calcium sulfate and said sea water feed is removed from heat exchange relationship with said flashing brine vapors at a temperature below about 290° F.

References Cited

UNITED STATES PATENTS

| | | | |
|---|---|---|---|
| 2,858,269 | 10/1958 | Harwood et al. | 210—42 |
| 2,979,442 | 4/1961 | Badger | 203—7 |
| 3,119,752 | 1/1964 | Checkovich | 202—173 |
| 3,298,931 | 1/1967 | Herbert et al. | 203—7 |
| 3,320,137 | 5/1967 | Jebens et al. | 202—173 |
| 3,340,159 | 9/1967 | Tidball et al. | 203—7 |
| 3,377,273 | 4/1968 | Glueckauf | 203—7 X |
| 3,376,204 | 4/1968 | Tidball | 203—7 |
| 3,401,094 | 9/1968 | Lindsay | 203—173 X |

OTHER REFERENCES

Saline Water Conversion Symposium (1958) U.S. Dept. Int., pp. 35, 36 and 45–50.

NORMAN YUDKOFF, Primary Examiner

F. E. DRUMMOND, Assistant Examiner

U.S. Cl. X.R.

159—2; 202—173; 203—11, 88